US011999268B2

United States Patent
David et al.

(10) Patent No.: US 11,999,268 B2
(45) Date of Patent: Jun. 4, 2024

(54) SYSTEM, METHOD, AND APPARATUS FOR CLASSIFYING AN OCCUPANT OF A VEHICLE SEAT

(71) Applicant: ZF ACTIVE SAFETY AND ELECTRONICS US LLC, Livonia, MI (US)

(72) Inventors: Raymond David, Dearborn Heights, MI (US); Harshad Dharmatti, Ann Arbor, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 1046 days.

(21) Appl. No.: 16/516,310

(22) Filed: Jul. 19, 2019

(65) Prior Publication Data

US 2021/0016682 A1      Jan. 21, 2021

(51) Int. Cl.
*B60N 2/00* (2006.01)
*B60R 21/00* (2006.01)
(Continued)

(52) U.S. Cl.
CPC ........ *B60N 2/002* (2013.01); *B60R 21/01516* (2014.10); *B60W 40/08* (2013.01);
(Continued)

(58) Field of Classification Search
CPC ........ B60R 21/01516; B60R 2021/006; B60R 2022/4858; B60R 21/015;
(Continued)

(56) References Cited

U.S. PATENT DOCUMENTS 6,012,007 A * 1/2000 Fortune ............. B60R 21/01516
                                                    280/730.1
6,438,477 B1 * 8/2002 Patterson ........... G01G 19/4142
                                                    280/801.1
(Continued)

FOREIGN PATENT DOCUMENTS

JP        2001074541 A    *  3/2001

OTHER PUBLICATIONS

Machine translation of JP-2001074541-A retrieved from Google Translate on Jul. 11, 2022 (Year: 2022).*

*Primary Examiner* — Thomas Ingram
*Assistant Examiner* — Faris Asim Shaikh
(74) *Attorney, Agent, or Firm* — ROSSI, KIMMS & McDOWELL LLP

(57) ABSTRACT

A method for determining an occupant class for a vehicle seat includes obtaining, via first and second seat weight sensors, first and second seat weight indications for the vehicle seat. The first seat weight sensor is located on the lateral side of the vehicle seat at a front location on the vehicle seat. The second seat weight sensor is located on the lateral side of the vehicle seat at a rear location on the vehicle seat. The method also includes obtaining a vehicle acceleration value from a vehicle acceleration sensor. The method also includes determining a raw weight on the vehicle seat as twice the sum of the first and second seat weight indications, and determining a filtered weight based on the raw weight. The method further includes determining the occupant class based on the filtered weight in response to the vehicle acceleration value being less than a predetermined value.

40 Claims, 10 Drawing Sheets

(51) Int. Cl.
*B60R 21/015* (2006.01)
*B60R 22/48* (2006.01)
*B60W 40/08* (2012.01)
*B60W 50/00* (2006.01)
*G01G 19/414* (2006.01)

(52) U.S. Cl.
CPC .... *G01G 19/4142* (2013.01); *B60R 2021/006* (2013.01); *B60R 2022/4858* (2013.01); *B60W 2040/0881* (2013.01); *B60W 2050/0029* (2013.01); *B60W 2540/043* (2020.02)

(58) Field of Classification Search
CPC ........ B60R 21/01546; B60R 21/01562; B60R 21/01556; B60R 21/01542; B60N 2/002; B60W 40/08; B60W 2040/0881; B60W 2050/0029; B60W 2540/043; B60W 2540/10; B60W 2050/0022; B60W 40/107; B60W 40/109; G01G 19/4142; G01G 19/32
See application file for complete search history.

(56) References Cited

U.S. PATENT DOCUMENTS

| | | | | |
|---|---|---|---|---|
| 6,476,516 B1* | 11/2002 | Reich | ............... | G06V 40/10 307/9.1 |
| 2002/0003345 A1* | 1/2002 | Stanley | ............ | B60R 21/01532 280/728.1 |
| 2002/0129986 A1* | 9/2002 | Aoki | ................ | B60R 21/01556 180/268 |
| 2002/0185318 A1* | 12/2002 | Aoki | ..................... | B60N 2/002 177/144 |
| 2003/0033065 A1* | 2/2003 | Vos | ................... | B60R 21/01516 701/45 |
| 2003/0154805 A1* | 8/2003 | Takafuji | ............ | B60R 21/01516 73/862.391 |
| 2003/0158643 A1* | 8/2003 | Murphy | ............ | B60R 21/01516 701/45 |
| 2003/0204295 A1* | 10/2003 | Thompson | ........ | B60R 21/01516 701/45 |
| 2005/0192727 A1* | 9/2005 | Shostak | ................. | G07C 5/008 701/1 |
| 2005/0205332 A1* | 9/2005 | Gray | ................ | B60R 21/01516 180/273 |
| 2007/0132220 A1* | 6/2007 | Breed | .............. | B60R 21/01516 701/45 |
| 2008/0312795 A1* | 12/2008 | Cho | ....................... | B60N 2/002 701/45 |
| 2011/0010037 A1* | 1/2011 | Inayoshi | ................ | B60N 2/002 701/31.4 |
| 2011/0010038 A1* | 1/2011 | Inayoshi | ........... | B60R 21/01516 701/31.4 |
| 2011/0010039 A1* | 1/2011 | Inayoshi | ............. | B60R 21/0152 701/31.4 |
| 2011/0054831 A1* | 3/2011 | Fujiwara | ............... | G06F 3/0346 702/141 |
| 2015/0175111 A1* | 6/2015 | Muramatsu | ....... | B60R 21/01516 702/150 |
| 2015/0192454 A1* | 7/2015 | Muramatsu | ........... | G01G 23/06 702/173 |
| 2017/0088097 A1* | 3/2017 | Hosokawa | ........ | B60R 21/01556 |

* cited by examiner

SYSTEM, METHOD, AND APPARATUS FOR CLASSIFYING AN OCCUPANT OF A VEHICLE SEAT

TECHNICAL FIELD

The invention relates generally to vehicle safety systems. More particularly, the invention relates to a vehicle safety system implementing an occupant classification system for detecting and classifying an occupant of a vehicle seat, so that the safety system can actuate vehicle safety devices, such as airbags (particularly front airbags), according to the classification (e.g., size, weight, presence, etc.) of the detected occupant.

BACKGROUND

Systems, methods, and apparatuses for detecting and classifying an occupant of a vehicle seat are known. Referring to FIG. 1, a safety system 10 includes a controller 12 that is operatively connected to four seat weight sensors (SWS1, SWS2, SWS3, SWS4) that measure the weight on a vehicle seat 14. Typically, as shown in FIG. 1, the seat weight sensors are located at four corner locations on a seat frame/rails 16 where the seat 14 is supported on the vehicle. These corner locations are front-left (Fr-L), rear-left (Rr-L), front-right (Fr-R), and rear-right (Rr-R).

Conventional weight-based occupant classification systems employ the sensed occupant weight as a sole parameter in determining the occupant classification and, as such, rely on inputs from all four corner locations. As shown in FIG. 1, SWS1 is located at the Fr-L position of the vehicle seat 14. SWS2 is located at the Rr-L of the vehicle seat 14. SWS3 is located at the Fr-R position of the vehicle seat 14. SWS4 is located at the Rr-R position of the vehicle seat 14. Together, the seat weight sensors can measure the weight of the occupant on the seat as the total of SWS1+SWS2+SWS3+SWS4.

Naturally, the seat weight sensors are responsive to shifting occupant loads due to both vehicle and occupant behavior. Examples of changes in vehicle behavior include high acceleration or deceleration, cornering or turning maneuvers, changes caused by rough roads etc. and an example of change in occupant behavior includes occupant repositioning.

The seat weight sensor responses will be in the form of increases and/or decreases in the sensed weights at the various vehicle seat corner positions, which could result in an erroneous changing of the occupant classification. Conventional vehicle safety systems with seat weight sensors at the four corner locations are adept at handling these shifting occupant loads and can inhibit changes in occupant classification due when such load shifting is detected.

SUMMARY

A system, method, and apparatus for classifying an occupant of a vehicle seat relies on only two seat weight sensor inputs, while remaining robust to shifting occupant loads due to vehicle and/or occupant behavior. While changes in vehicle and/or occupant behavior may have a dramatic influence on the loads sensed in a two-sensor occupant classification system due to the influence of the un-sensed load path, the system utilizes vehicular kinematic parameters such as wheel speeds, lateral acceleration and longitudinal acceleration, as well as a unique filtering scheme to make occupant classification determinations.

Occupant classification is used to manipulate or tailor front airbag deployment. Therefore, it is important for the vehicle safety system to accurately and reliably classify the occupant of the passenger seat.

According to one aspect, a method for determining an occupant class for a vehicle seat includes obtaining, via first and second seat weight sensors, first and second seat weight indications for the vehicle seat. The first seat weight sensor is located on the lateral side of the vehicle seat at a front location on the vehicle seat. The second seat weight sensor is located on the lateral side of the vehicle seat at a rear location on the vehicle seat. The method also includes obtaining a vehicle acceleration value from a vehicle acceleration sensor. The method also includes determining a raw weight on the vehicle seat as twice the sum of the first and second seat weight indications, and determining a filtered weight based on the raw weight. The method further includes determining the occupant class based on the filtered weight in response to the vehicle acceleration value being less than a predetermined value.

According to another aspect, the method can include suppressing classification changes in response to the vehicle acceleration value being greater than a predetermined threshold value.

According to another aspect, alone or in combination with any other aspect, suppressing classification changes can include suppressing the classifications for a time delay.

According to another aspect, alone or in combination with any other aspect, the vehicle acceleration value can include a vehicle lateral acceleration and/or a vehicle longitudinal acceleration.

According to another aspect, alone or in combination with any other aspect, the occupant class can be selected from one of the following classes: no occupant class, child seat class, small adult class, and large adult class. According to this aspect the no occupant class can be associated with measured seat weights up to a first weight, the child seat class can be associated with measured seat weights ranging from the first weight up to a second weight, greater than the first weight, the small adult class can be associated with measured seat weights ranging from the second weight up to a third weight, greater than the second weight, and the large adult class can be associated with measured seat weights greater or equal to than the third weight. For example, the first weight can be about 10.8 kg, the second weight can be about 29.4 kg, and the third weight can be about 54.8 kg.

According to another aspect, alone or in combination with any other aspect, determining the filtered weight can include selecting one of an unfiltered weight, a short filtered weight, and a long filtered weight. The short filtered weight can be determined using a low pass filter with a comparatively short time constant, and the long filtered weight can be determined using a low pass filter with a comparatively long time constant. As an example, the comparatively short time constant can be about 1-2 seconds and the comparatively long time constant can be about 5-20 seconds.

According to another aspect, alone or in combination with any other aspect, selecting one of an unfiltered weight, a short filtered weight, and a long filtered weight can include selecting the long filtered weight in response to determining that the vehicle is moving and the seat is occupied, and selecting the short filtered weight in response to determining that the vehicle is not moving and the seat is unoccupied.

According to another aspect, alone or in combination with any other aspect, selecting one of an unfiltered weight, a short filtered weight, and a long filtered weight can include selecting the unfiltered weight for a predetermined startup time, selecting the short filtered weight after the startup time expires, selecting the long filtered weight in response to determining that the vehicle is moving and the seat is occupied, and selecting the short filtered weight in response to determining that the vehicle is not moving and the seat is unoccupied.

According to another aspect, alone or in combination with any other aspect, selecting one of an unfiltered weight, a short filtered weight, and a long filtered weight can include selecting the unfiltered weight for an initial startup time, selecting the short filtered weight until the vehicle is moving and the seat is occupied, and thereafter selecting the long filtered weight until the vehicle stops moving.

According to another aspect, alone or in combination with any other aspect, the method can include overriding the determined occupant class in response to determining an unbuckled status of the seatbelt associated with the vehicle seat.

According to another aspect, alone or in combination with any other aspect, determining the occupant class based on a filtered weight can include implementing a hysteresis logic function that assigns the occupant class based on the filtered weight and prevents changes in the assigned occupant class due to fluctuations in the filtered weight due to seat loading in response to vehicle operation and/or the occupant changing positions on the seat. The hysteresis logic function can implement overlapping weight ranges for each occupant class, each weight range comprising a high threshold and a low threshold. The hysteresis logic function can assign the next higher occupant class in response to the filtered weight exceeding the high threshold. The hysteresis logic function can assign the next lower occupant class in response to the filtered weight dropping below the low threshold. Each weight range can also include a conformance threshold. The conformance threshold can be the nominal weight value for the corresponding occupant class, and can be utilized to determine an initial occupant class.

According to another aspect, alone or in combination with any other aspect, determining the occupant class based on a filtered weight can include implementing a hysteresis logic function that assigns the occupant class based on the filtered weight and prevents changes in the assigned occupant class due to fluctuations in the filtered weight due to seat loading in response to vehicle operation and/or the occupant changing positions on the seat.

According to another aspect, alone or in combination with any other aspect, determining the filtered weight based on the raw weight can include implementing a freeze filter function that freezes the filtered weight value in response to a vehicle lateral acceleration being above a predetermined threshold.

According to another aspect, alone or in combination with any other aspect, the first seat weight sensor measures seat weight at a front inboard mounting location of the seat, and the second seat weight sensor measures seat weight at a rear inboard mounting location of the seat. Alternatively, the first seat weight sensor measures seat weight at a front outboard mounting location of the seat, and the second seat weight sensor measures seat weight at a rear outboard mounting location of the seat.

According to another aspect, alone or in combination with any other aspect, an occupant classification system for determining an occupant class associated with a vehicle seat, comprising a controller operable to implement an occupant classification algorithm according to the method for determining an occupant class for a vehicle seat.

According to another aspect, alone or in combination with any other aspect, a vehicle safety system can include the occupant classification system, at least one vehicle occupant safety device, and an airbag ECU operable to control actuation of the at least one vehicle occupant safety device. The airbag ECU is operatively connected to the controller of the occupant classification system. The airbag ECU is configured to control actuation of the at least one vehicle occupant safety device in response to the occupant classification determined via the occupant classification algorithm implemented in the controller.

DRAWINGS

DESCRIPTION

Figure 1:
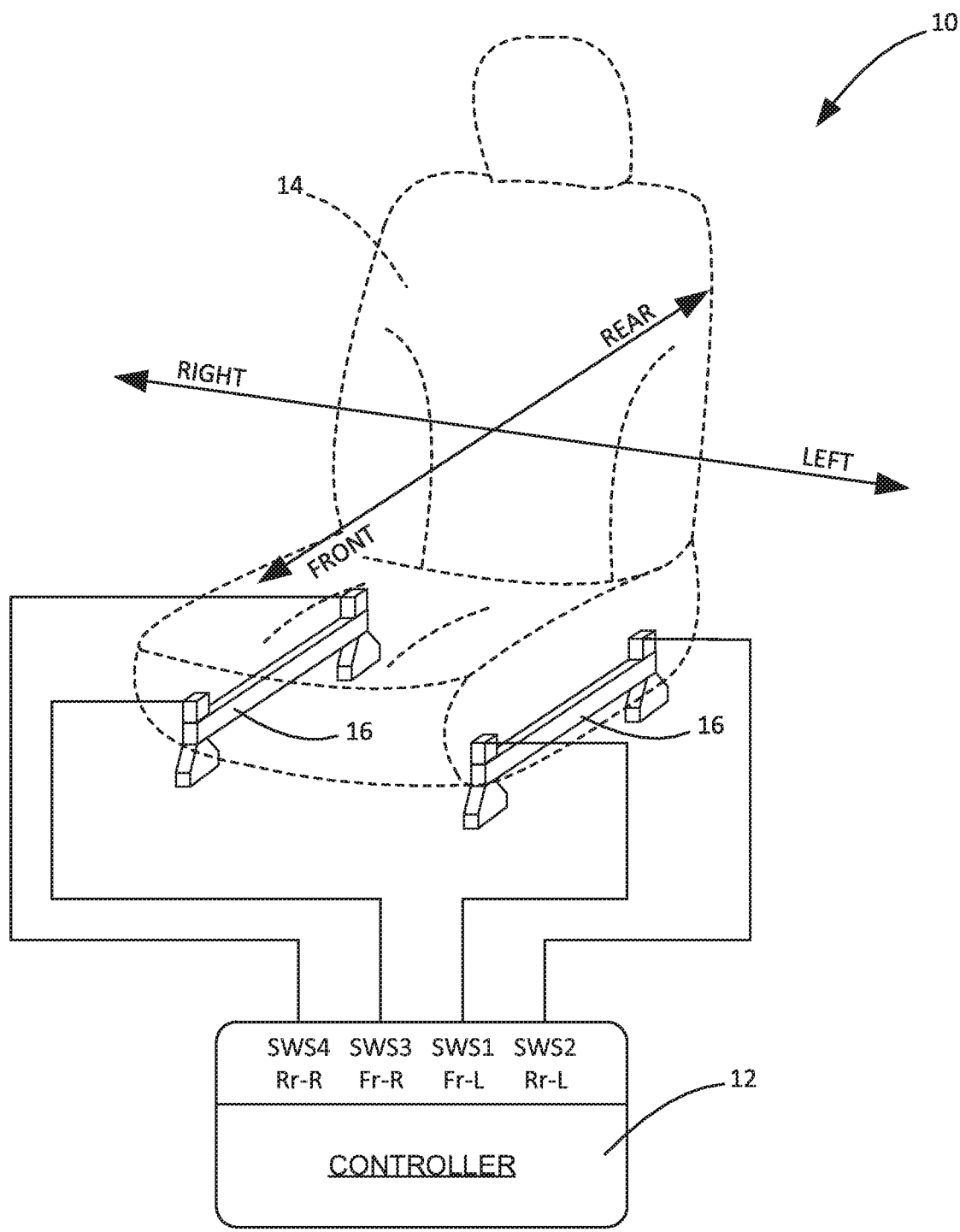
FIG. 1 is a schematic illustration of a vehicle seat and a vehicle safety system.

Referring to FIG. 1, a safety system 10 includes a controller 12 that is operatively connected to four seat weight sensors (SWS1, SWS2, SWS3, SWS4) that measure the weight on a passenger side vehicle seat 14. The seat weight sensors are located at four corner locations on a seat frame/rails 16 were the seat 14 is supported on the passenger side of the vehicle. These corner locations are front-left (Fr-L), rear-left (Rr-L), front-right (Fr-R), and rear-right (Rr-R).

Figure 2:
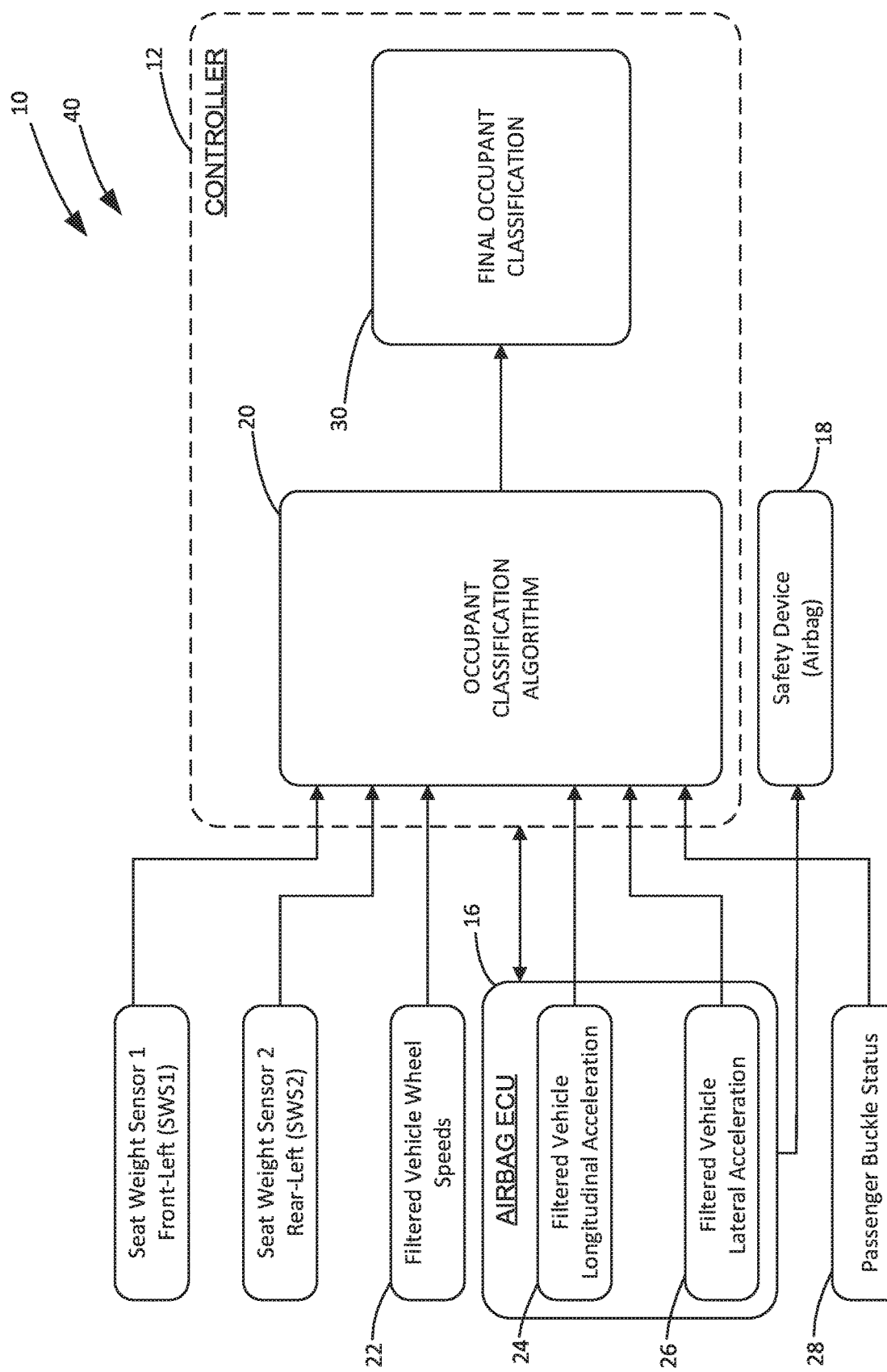
FIG. 2 is a block diagram illustrating an occupant classification system implemented by the vehicle safety system.

Referring to FIG. 2, the vehicle safety system 10 includes/implements an occupant classification system 40 to determine whether an occupant is seated on the passenger seat and, if so, the classification of the occupant so seated. The classifications can be those known and identified in the art of vehicle safety systems. For example, the classifications include the seat being unoccupied, occupied by a child or child seat, occupied by a small adult (e.g., a 5% female occupant), or a large adult (e.g., a 50% male occupant).

The occupant classification determined by the occupant classification system 40 can be used by an airbag controller or ECU 16 to control actuation of safety devices 18, such as airbags (e.g., front airbags) and load limiters when a vehicle collision is detected. For example, when the occupant classification system 40 indicates that the seat is empty or occupied by a child and/or a child safety seat, deployment of the airbag may be inhibited. If the occupant classification system 40 indicates that the seat is occupied by a small adult, the airbag may be deployed with a first intensity (timing, inflation fluid volume/flow rate, etc.). If the occupant classification system 40 indicates that the seat is occupied by a large adult, the airbag may be deployed with a second intensity, different, e.g., greater than the first intensity.

The occupant classification system 40 implements an occupant classification algorithm 20 on the controller 12. The occupant classification algorithm 20 is operative to determine a final occupant classification 30 based on data inputted into the controller 12. The data can, for example, be obtained directly from sensors via wired or wireless connections to the controller 12, or indirectly from other vehicle systems via a data/communication bus connection.

The inputs to the controller 12 include:
Front-Left Seat Weight Sensor SWS1
Rear-Left Seat Weight Sensor SWS2
Filtered Vehicle Wheel Speeds 22

Filtered Vehicle Longitudinal Acceleration 24
Filtered Vehicle Lateral Acceleration 26
Passenger Buckle Status 28

It is important to note that only two seat weight sensors are utilized by the occupant classification algorithm 20 to determine the final occupant classification 30. As shown in FIG. 2, those two sensors SWS1, SWS2 are front left and rear left, respectively located. Since the occupant classification system 40 is for the passenger side of the vehicle, these SWS1 and SWS2 are inboard positioned seat weight sensors. The occupant classification system 40 could, however, utilize SWS3 and SWS4, which are right/outboard front and rear positioned weight sensors. Either pair, i.e., SWS1 & SWS2 or SWS3 & SWS4, can be implemented in the occupant classification system 40.

The occupant classification system 40 classifies the occupant of the vehicle seat 14 using only two seat weight sensors—SWS1 and SWS2 along with kinematic data for the vehicle. In the example configuration illustrated in the figures, the kinematic data is determined from the filtered wheel speeds 22, the filtered vehicle longitudinal acceleration 24, and the filtered vehicle lateral acceleration 26. In essence, the occupant classification system 40 determines the occupant weight as being double that measured by the two seat weight sensors SWS1, SWS2. Recognizing that this measurement only works when forces other than gravity are not acting on the occupant, the occupant classification system 40 monitors the vehicle kinematic data to determine whether longitudinal or lateral vehicle accelerations acting on the occupant render the weights measured by SWS1 and SWS2 inaccurate.

For example, if the vehicle is executing a right hand turn or rounding right hand corner, the occupant will shift inboard due to inertia/centrifugal force. When this occurs, SWS1 and SWS2 will see an increase in their sensed weights due to the occupant shifting. Similarly, if the vehicle is executing a left hand turn or rounding left hand corner, the occupant will shift outboard due to inertia/centrifugal force. When this occurs, SWS1 and SWS2 will see a decrease in their sensed weights due to the occupant shifting. To combat this phenomena, the occupant classification system 40 monitors the vehicle kinematic data to determine when occupant shifting occurs or is likely to occur and accounts for this in the determined occupant classification by, for example, inhibiting changes to the occupant classification.

Figure 3:
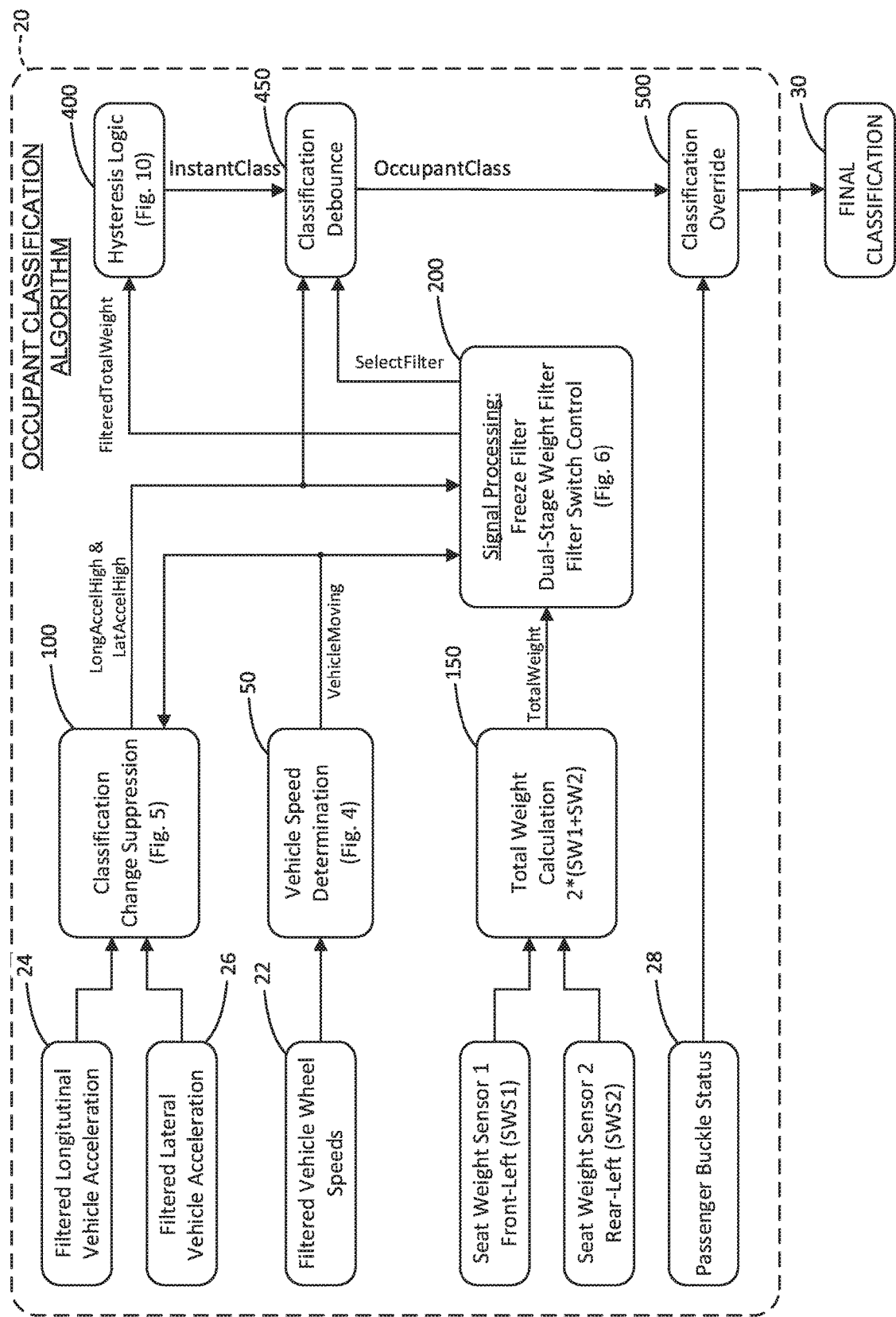
FIGS. 3-10 are block diagrams illustrating an occupant classification algorithm implemented by the occupant classification system.

FIG. 3 illustrates an overview of the occupant classification algorithm 20 implemented by the occupant classification system 40. The occupant classification algorithm 20 includes a vehicle speed determination function 50 that receives the filtered vehicle wheel speeds 22 and produces a Vehicle Moving Flag output (VehicleMoving), which is a Boolean indicator, i.e., VehicleMoving=YES or NO.

A total weight calculation function 150 receives sensed seat weight signals from the seat weight sensors SWS1 and SWS2. The function 150 calculates the total weight (TotalWeight) as being twice the sum of the seat weight signals SWS1 and SWS2, i.e., Total Weight=2×(SWS1+SWS2).

A classification change suppression function 100 receives the filtered vehicle longitudinal acceleration 24, the filtered vehicle lateral acceleration 26, and the Vehicle Moving Flag (VehicleMoving). The classification change suppression function 100 produces a longitudinal acceleration high (LongAccelHigh) flag and a lateral acceleration high (LatAccelHigh) flag, which are Boolean indicators, i.e., LongAccelHigh=YES or NO, and LatAccelHigh=YES or NO. The classification change suppression function 100 is operative to determine whether vehicle accelerations could affect the vehicle seat weight determined via SWS1 and SWS2. In response to determining that the seat weight could be affected, the classification change suppression function 100 is operative to inhibit or suppress a change in the occupant classification determined by the occupant classification algorithm 20.

A signal processing function 200 receives TotalWeight from the total weight function 150, and the LongAccelHigh Flag and LatAccelHigh Flag from the classification change suppression function 100. The signal processing function 200 implements a freeze filter algorithm, a dual-stage weight filter algorithm, and a filter switch control algorithm. The signal processing function 200 produces a filtered total weight signal (FilteredTotalWeight) and a filter selection flag (FilterSelect). The signal processing function 200 determines the filtered total weight, taking into account the vehicle kinematics and the effects that this may have on the measured seat weight.

The signal processing function 200 includes hysteresis logic 400 that produces an instantaneous classification (InstantClass). The instantaneous class is the determined classification of the occupant of the vehicle seat 14, based on the filtered total weight (FilteredTotalWeight) determined by the signal processing function 200. The classifications can, for example, be those shown in the following table:

TABLE 1

| Occupant Classification | Occupant Type | Weight |
| --- | --- | --- |
| Class 0 | No Occupant | 0.0 kg |
| Class 1 | No Occupant/Child Seat with Seatbelt Buckled | 10.8 kg |
| Class 2 | Small Adult (e.g., 5% Female) | 29.4 kg |
| Class 3 | Large Adult (e.g., 50% Male) | 54.8 kg |
| Class 4 | Undetermined/Fault Condition | N/A |

Figure 4:
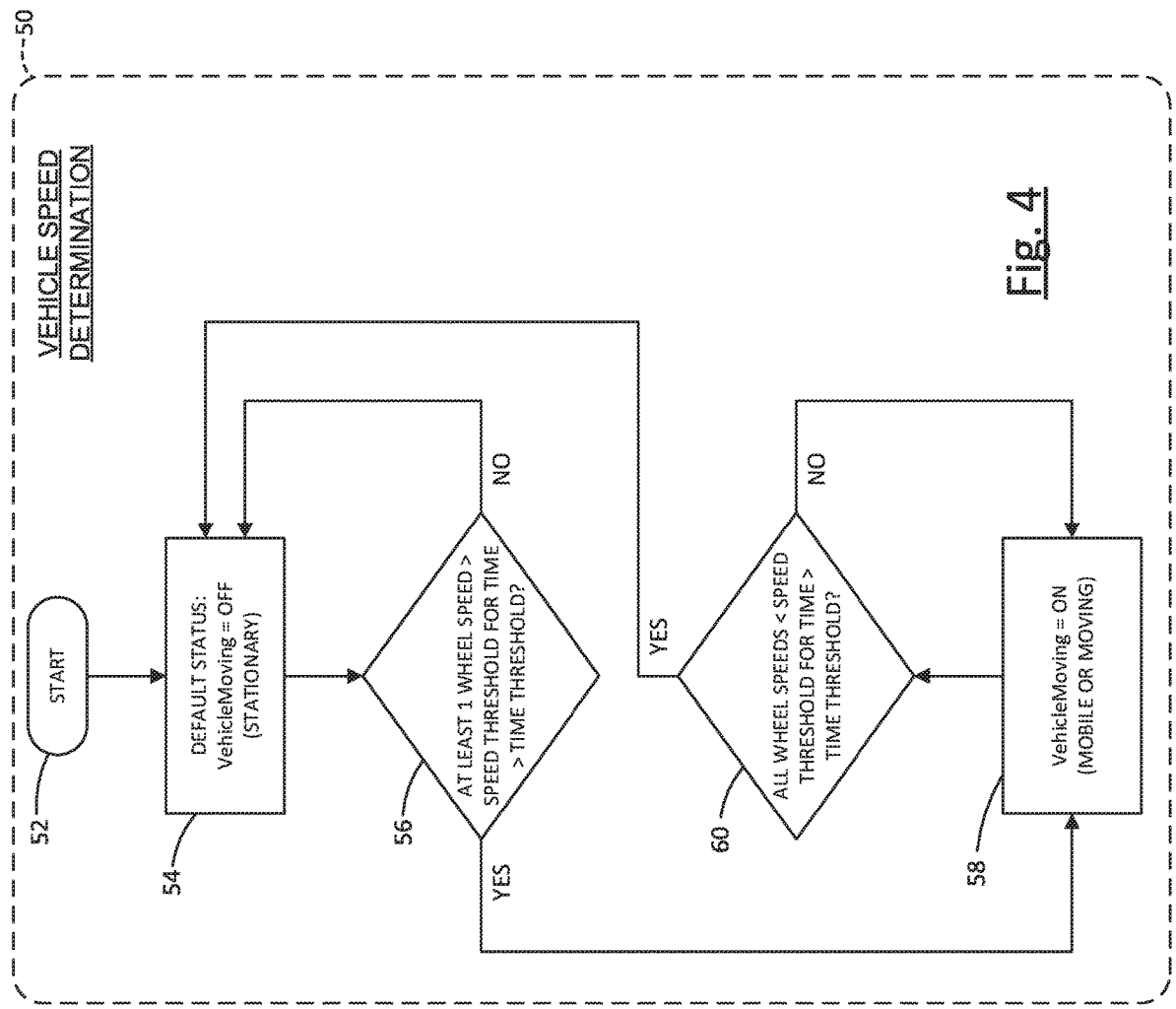

FIG. 4 is a functional block diagram illustrating the vehicle speed determination function 50 of the occupant classification algorithm 20 (see FIG. 3) implemented by the occupant classification system 40. The function 50 begins at step 52 and proceeds to step 54, where the default status is established as the VehicleMoving=OFF (or Boolean zero). The function 50 proceeds to step 56, where a determination is made as to whether at least one wheel speed is greater than a predetermined speed threshold for a time greater than a predetermined time threshold. The predetermined speed threshold at step 56 can be any value greater than zero.

If, at step 56, the wheel speed is greater than the speed threshold for the time threshold, the function 50 proceeds to step 58, where the vehicle moving flag is set to VehicleMoving=ON (or Boolean one). The process 50 then proceeds to step 60 where a determination is made as to whether all wheel speeds are equal to or less than a predetermined speed for a time greater than a predetermined threshold. If the determination at step 60 is true (YES), the process reverts back to step 54 and the vehicle moving flag is reset to default status, i.e., VehicleMoving=OFF. The predetermined speed at step 60 can, for example, be zero.

If, at step 56, the wheel speed is not greater than the speed threshold for the time threshold, the function 50 reverts back to step 54. The vehicle moving flag is maintained at the default status, i.e., VehicleMoving=OFF, and the process continues as described above.

Figure 5:
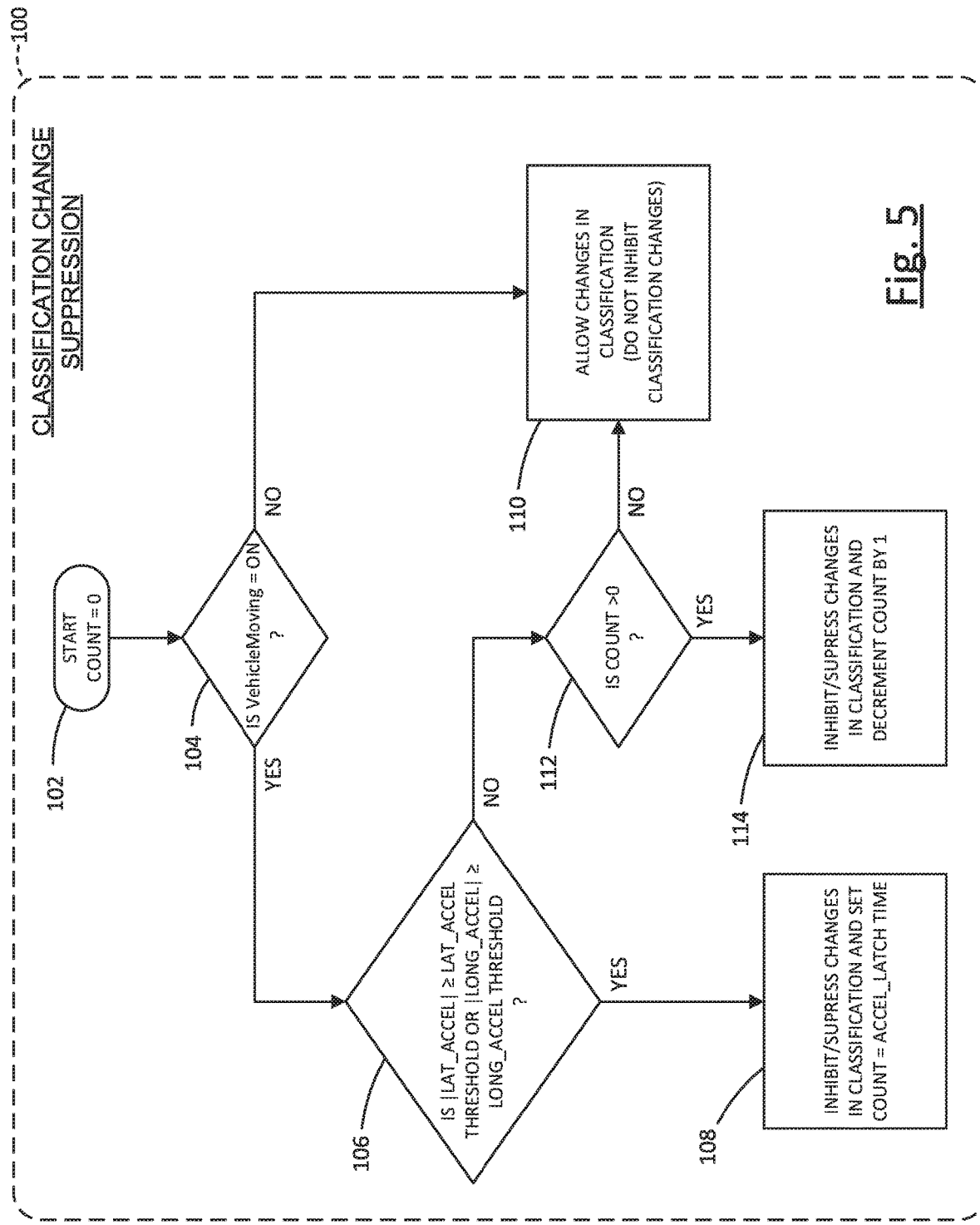

FIG. 5 is a functional block diagram illustrating the classification change suppression function 100 of the occupant classification algorithm 20 (see FIG. 3) implemented by the occupant classification system 40. The function 100 begins at step 102, where a count is initialized as being equal to zero. The function 100 proceeds to step 104, where the vehicle moving flag (see FIG. 4) is queried. If the vehicle is not moving, the function 100 proceeds to step 110, and changes to the occupant classification are permitted.

If, at step 104, the vehicle is moving (VehicleMoving=ON), the function 100 proceeds to step 106, where a determination is made as to whether the lateral acceleration (LAT_ACCEL) is greater than a lateral acceleration threshold or the longitudinal acceleration (LONG_ACCEL) is greater than a longitudinal acceleration threshold. If either of these conditions is true, the function 100 proceeds to step 108 and inhibits/suppresses changes in the occupant classification. The count is set to equal an acceleration latch time (ACCEL_LATCH), which is an integer equal to a number of samples taken by the system. Based on the sample rate of the system, it can be seen that the count serves as a time lag or delay that is used to inhibit classification changes for a number of samples dictated by the count.

If, at step 106 it is determined that neither condition is true, the function 100 proceeds to step 112, where a determination is made as to whether the count is greater than zero. If the count is greater than zero, the function 100 proceeds to step 114, and inhibits/suppresses changes in the occupant classification and decrements the count by one. This cyclical countdown of the counter to zero serves as the aforementioned time delay. If, at step 112, the count is determined not greater than zero, the function 100 proceeds to step 110, and changes to the occupant classification are permitted.

From the above, it can be seen that the classification change suppression function 100 serves to suppress changes in the occupant classification while the vehicle is undergoing longitudinal or lateral accelerations greater than a predetermined threshold, since these accelerations can affect the seat weights sensed via the sensors SWS1 and SWS2. These acceleration thresholds can vary, with the lateral acceleration threshold being lower than that of the longitudinal acceleration threshold. For example, the lateral acceleration threshold can be 0.18 G (g-force) and the longitudinal acceleration threshold can be 1.0 G.

Figure 6:
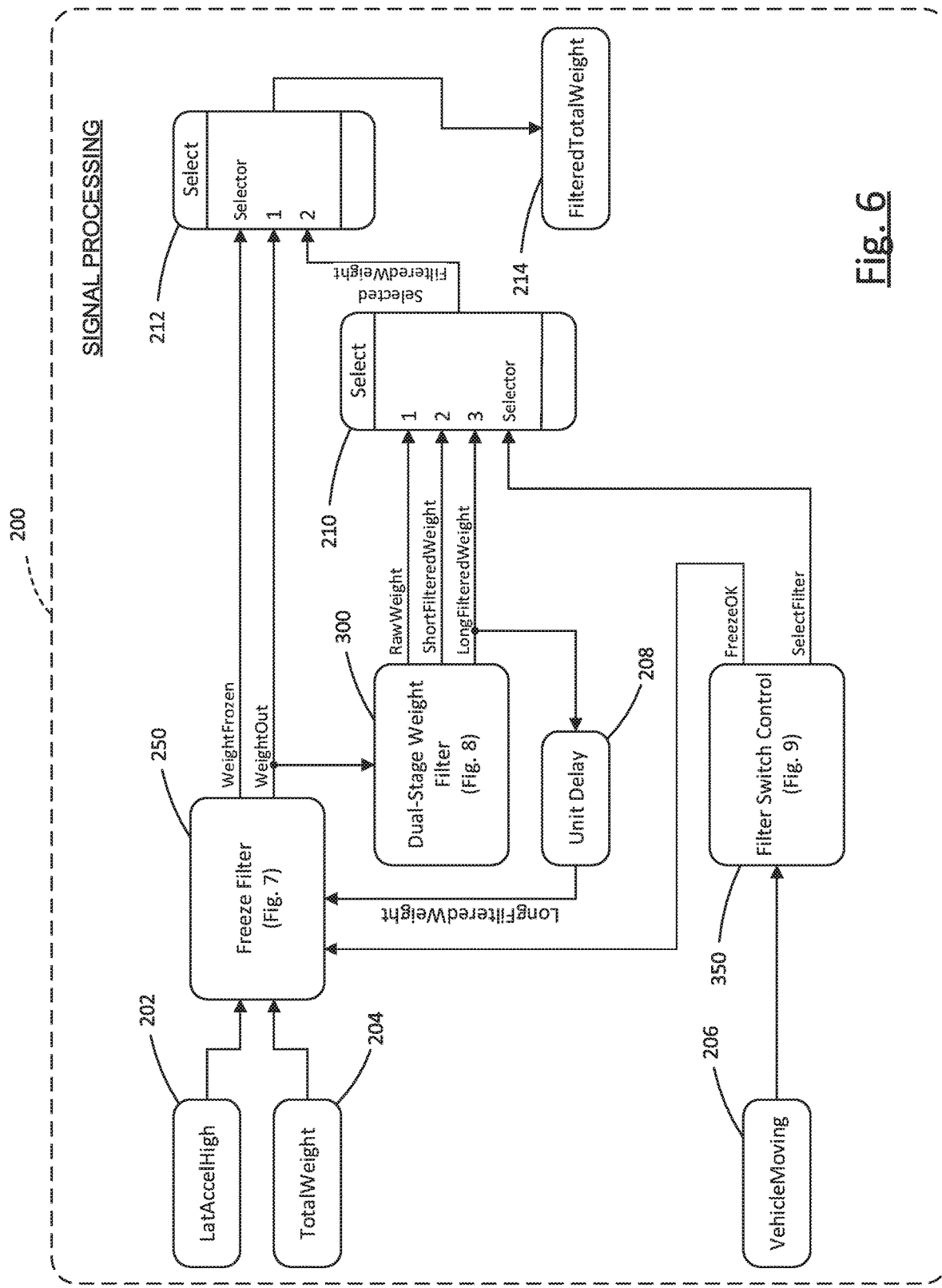

FIG. 6 is a block diagram illustrating the signal processing function 200 of the occupant classification algorithm 20 (see FIG. 3) implemented by the occupant classification system 40. The signal processing function 200 includes a freeze filter 250, which receives the lateral acceleration high (Lat_Accel_High) flag 202 from the classification change suppression function (see FIG. 5). The freeze filter 250 also receives the total weight indication (TotalWeight) 204 from the total weight calculation function 150 (see FIG. 3). The freeze filter 250 also receives a long filtered weight (LongFilteredWeight) from a unit delay function 208. The freeze filter 250 also receives a Boolean freeze filter enabled flag (FreezeOK) from a filter switch control function 350 (see FIG. 9). Using these inputs, the freeze filter 250 performs a function (see FIG. 7) that produces a weight output (WeightOut) and a Boolean freeze weight flag (WeightFrozen), where ON=Freeze and OFF=Unfreeze.

Figure 7:
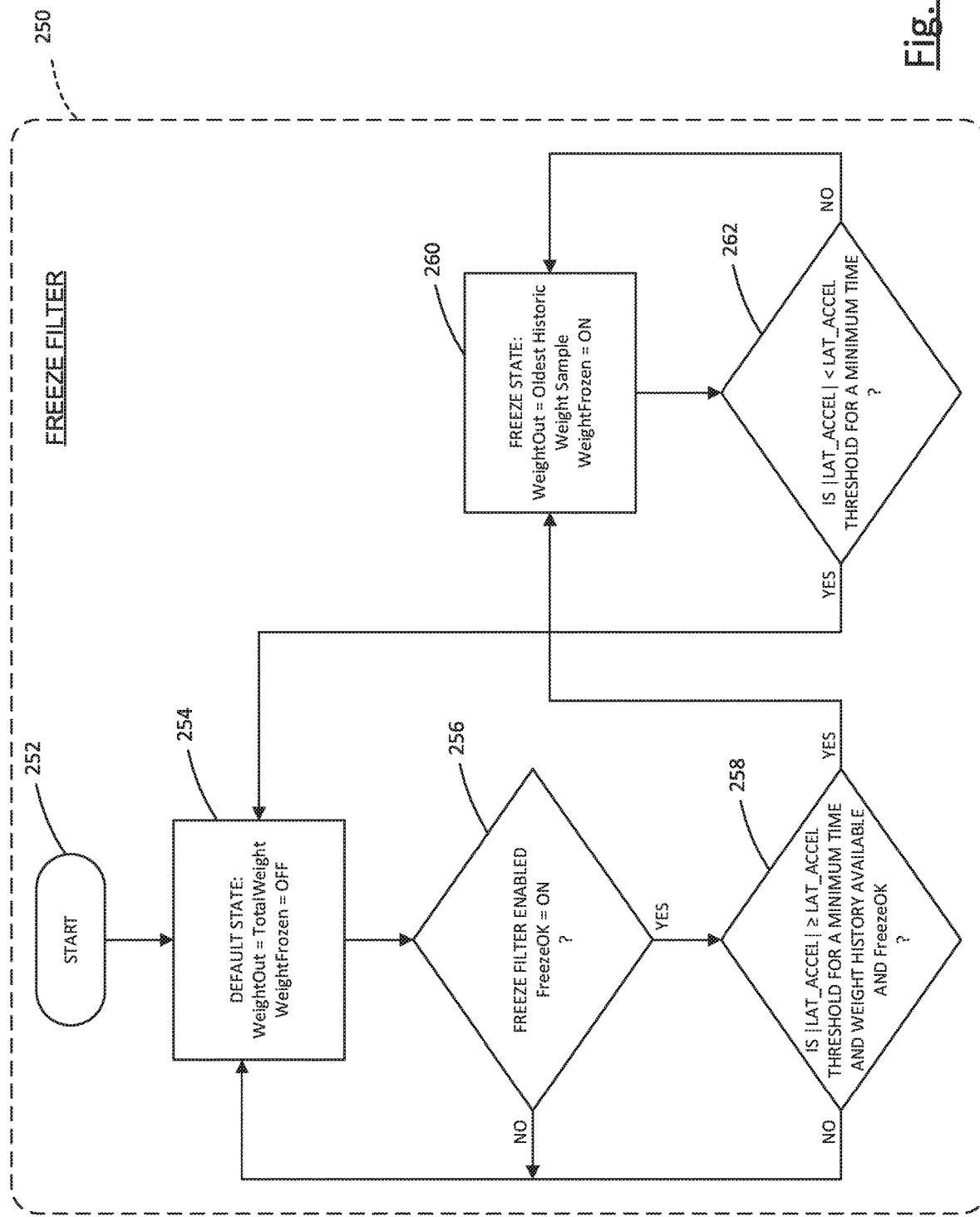

FIG. 7 is a block diagram illustrating the freeze filter function 250 of the signal processing function 200 of the occupant classification algorithm 20 (see FIG. 3) implemented by the occupant classification system 40. The freeze filter function 250 starts at step 252 and proceeds to step 254, where a default state is established. In the default state, the weight output (WeightOut) of the freeze filter function 250 is set equal to the total weight (TotalWeight) and the freeze weight flag (WeightFrozen) is set to OFF. The freeze filter function 250 proceeds to step 256, where a determination is made as to whether the freeze filter enabled flag (FreezeOK) is ON (see, FIG. 9—filter switch control function 350).

If the freeze filter enabled flag is OFF, the freeze filter function 250 reverts back to step 254 and proceeds as described above, with the function operating in a loop delay until the freeze filter enabled flag switches to ON. When this occurs (FreezeOK=ON), the function 250 proceeds to step 258, where a determination is made as to whether the lateral vehicle acceleration (LAT_ACCEL) is ≥a vehicle lateral acceleration threshold (e.g., 0.18 G) for a minimum time and weight history is available and the freeze filter enabled flag (FreezeOK) is ON. If this determination is NO, the freeze filter function 250 reverts back to step 254 and proceeds as described above, with the function operating in a loop delay until the freeze filter enabled flag switches to ON.

If, at step 258 of the freeze filter function 250, the determination is YES, the function proceeds to step 260 and enters the Freeze State, where WeightOut is set equal to the oldest historic weight sample and the WeightFrozen Flag is set to ON. The freeze filter function 250 then proceeds to step 262 where a determination is made as to whether the lateral vehicle acceleration (LAT_ACCEL) is <the vehicle lateral acceleration threshold (e.g., 0.18 G) for a minimum time. If this determination is YES, the freeze filter function 250 reverts back to step 254 and proceeds as described above, with the function operating in a loop delay until the freeze filter enabled flag switches to ON. If the determination at step 262 is NO, the freeze filter function 250 reverts back to step 260 and proceeds as described above, with the function operating in a loop delay until the determination of step 262 switches to YES.

Referring back to FIG. 6, the signal processing function 200 also includes a dual-stage weight filter 300, which receives the weight output (WeightOut) from the freeze filter 250. The dual-stage weight filter 300 performs a function (see FIG. 8) that produces a raw weight output (RawWeight), a short filtered weight output (ShortFilteredWeight) and a long filtered weight output (Long FilteredWeight).

Figure 8:
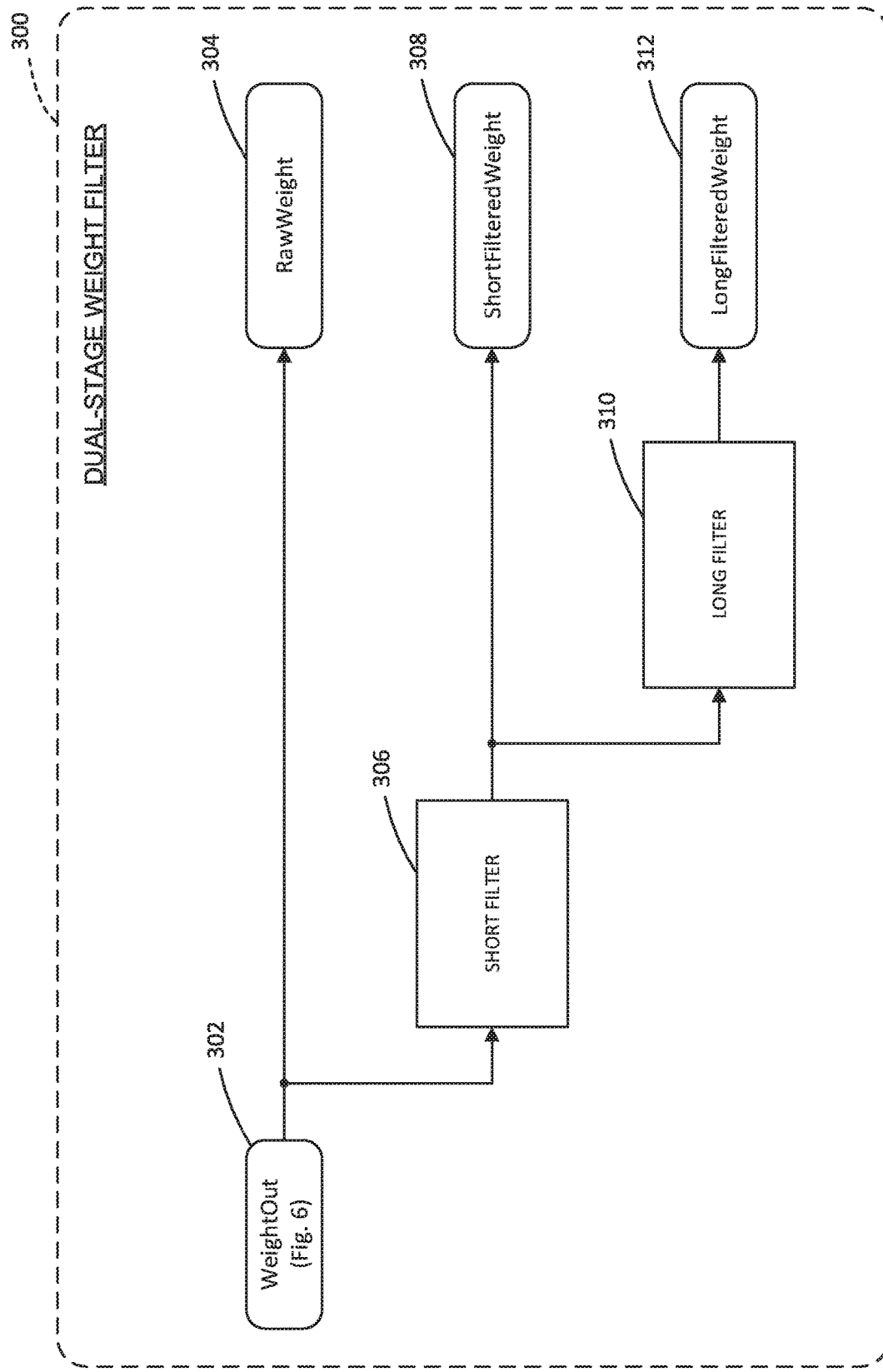

FIG. 8 is a block diagram illustrating the dual-stage weight filter 300 of the signal processing function 200 of the occupant classification algorithm 20 (see FIG. 3) implemented by the occupant classification system 40. The dual stage weight filter receives the weight output (WeightOut) from the freeze filter function 250 (see FIGS. 6 and 7) as indicated at 302. WeightOut passes through the dual-stage weight filter function 300 and is outputted as the raw weight (RawWeight), as indicated at 304. A short filter 306 receives and filters WeightOut, outputting the short filtered weight (ShortFilteredWeight), as indicated at 308. The short filter is a moving average FIR (finite impulse response) filter with a small time constant. Typical time constant values can be within 1-2 seconds. A long filter 310 receives and filters ShortFilteredWeight, outputting the long filtered weight (LongFilteredWeight), as indicated at 312. The long filter is an IIR (infinite impulse response) filter with a large time constant. Typical time constant values can be within 5-20 seconds.

Referring back to FIG. 6, the signal processing function 200 also includes a filter switch control function 350, which receives the vehicle moving flag (VehicleMoving) from the vehicle speed determination function 50 (see FIGS. 3 and 4). The filter switch control function 250 performs a function (see FIG. 9) that produces freeze filter enabled flag (FreezeOK) and a filter selector (SelectFilter) output.

Figure 9:
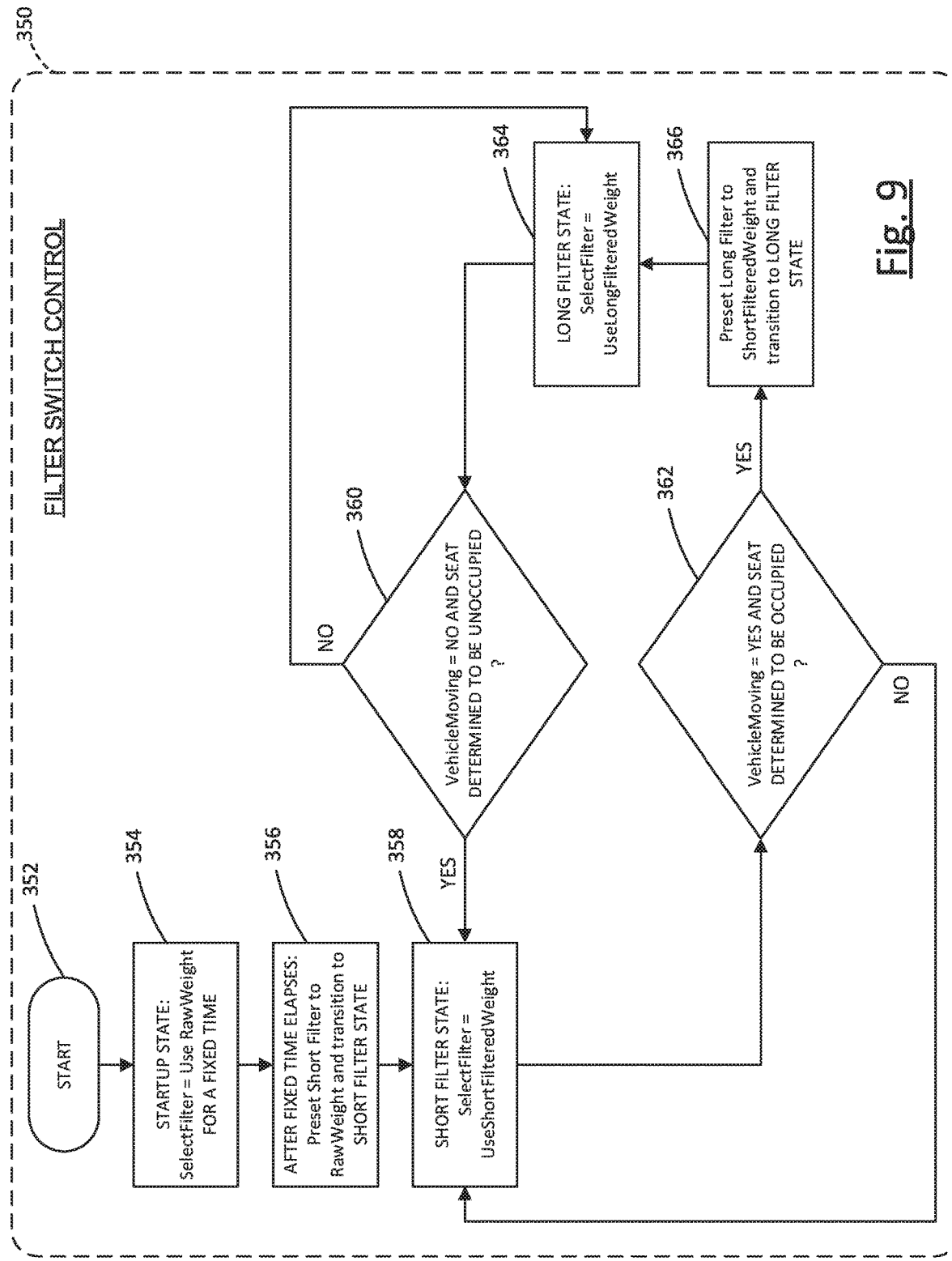

FIG. 9 is a block diagram illustrating the filter switch control function 350 of the signal processing function 200 of the occupant classification algorithm 20 (see FIG. 3) implemented by the occupant classification system 40. The filter switch control function 350 starts at 352 and proceeds to step 354, entering a startup state. In the startup state, the filter selector is initialized to use the raw weight (SelectFilter=UseRawWeight) determined by the dual-stage weight filter 350 (see FIG. 8) for a fixed time. The filter switch control function 350 then proceeds to step 356 where, after the fixed time of step 354 elapses, the short filter 306 (see FIG. 8) is preset to raw weight (RawWeight) and the filter switch control function 350 transitions to the short filter state and proceeds to step 358. In the short filtered state, the filter selector is set to use the short filter weight (SelectFilter=UseShortFilteredWeight).

The value of the fixed time implemented in step 356 depends on the time required for the short filter output to stabilize within about ±5% of a constant final value, given a constant input. Ideally, the value of the fixed time is less than 1 second. The fixed time can be lower and can even be set to 0 seconds if the short filter output is guaranteed to be stable when the occupant classification algorithm is first invoked by the airbag ECU.

The filter switch control function 350 proceeds to step 362, where a determination is made as to whether the vehicle is moving (VehicleMoving=YES, see FIG. 4) and the seat is determined to be occupied. The SEAT OCCUPIED determination can, for example, be determined to be YES when the measured seat weight (e.g., FilteredTotalWeight) is greater than a predetermined threshold value, typically 10 KG. If the determination at step 362 is NO, the filter switch control function 350 reverts back to step 358 and proceeds as described above, with the function operating in a loop delay until the determination of step 362 switches to YES.

If the determination at step 362 is Yes, the filter switch control function 350 proceeds to step 366, where the long filter (see FIG. 8) is preset to the short filtered weight (ShortFilteredWeight) and transitions to the long filter state and proceeds to step 364. In the long filter state, the filter selector is set to use the long filtered weight (SelectFilter=UseLongFilteredWeight). The filter switch control function 350 proceeds to step 360, where a determination is made as to whether the vehicle is stationary (VehicleMoving=NO, see FIG. 4) and the seat is determined to be unoccupied, e.g., FilteredTotalWeight<10 KG. If the determination at step 360 is NO, the filter switch control function 350 reverts back to step 364 and proceeds as described above, with the function operating in a loop delay until the determination of step 360 switches to YES. When the determination of step 360 is Yes, the filter switch control function 350 proceeds back to step 358 and enters the short filter state.

From the above, it will be appreciated that the filter switch control function 350 is operative to determine which measured seat weight value is used to determine the occupant classification. Raw weight is used for an initial startup time, after which the short filtered weight is used until a determination is made that the vehicle is moving and the seat is occupied. Once this is determined, the long filtered weight is used.

Referring back to FIG. 6, the signal processing function 200 also includes a first weight selector 210, which is operative to select from the weights provided by the dual-stage weight filter function 300 (see, FIG. 8) based on the filter select value (SelectFilter) from the filter switch control function 350 (see, FIG. 9). The first weight selector 210 provides a selected filtered weight output (SelectedFilteredWeight) to a second weight selector 212. The second weight filter 212 selects between the selected filtered weight output (SelectedFilteredWeight) and the weight output (WeightOut) from the freeze filter function 250 (see FIG. 7) based on the weight frozen flag (WeightFrozen) from the freeze filter function. If weight is frozen (WeightFrozen=YES), the freeze filter weight output (WeightOut) is selected. If weight is not frozen (WeightFrozen=NO), the selected filtered weight (SelectedFilteredWeight) is selected. The weight value selected by the second weight selector 212 is outputted as the filtered total weight (FilteredTotalWeight).

Figure 10:
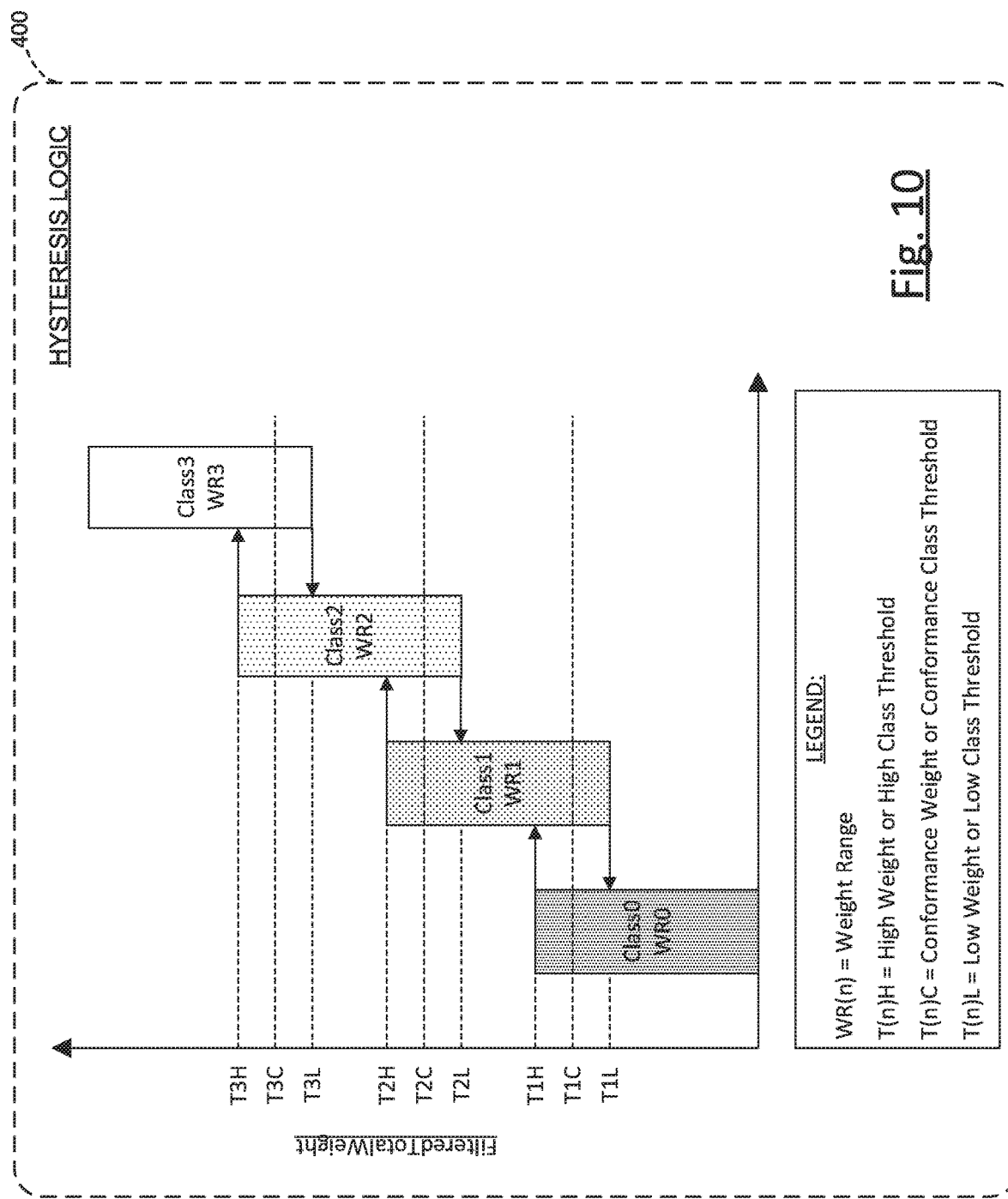

Referring back to FIG. 3, the filtered total weight (FilteredTotalWeight) is provided to a hysteresis logic function 400, which is illustrated in FIG. 10. The hysteresis logic function 400 is operative to impart hysteresis into the occupant class determination. Referring to FIG. 10, four occupant classifications (Class 0-Class 3) are associated with four corresponding weight ranges (WR0-WR3). With filtered total weight (FilteredTotalWeight) being indicated on the Y-axis, it can be seen that the classes and their respective weight ranges increase from Class 0/WR0 to Class 3/WR3. The classes can, for example, correspond with those set forth in Table 1. The weight ranges include their respective weight values shown in Table 1 and overlap each other as shown in FIG. 10.

Each area of overlapping class or weight range includes three thresholds: a low weight/class threshold, $T(n)L$, a conformance weight/class threshold, $T(n)C$, and a high weight/class threshold, $T(n)H$. The conformance weight/class threshold $T(n)C$ represents the nominal weight value for the class, i.e., the weight specified in Table 1. The conformance weight/class thresholds $T(n)C$ are used to obtain the occupant classification during the time between first algorithm call and InitialClassDelay (i.e., the debouncing time for the first classification). They are also used when the occupant classification is level 0. The high and low weight/class thresholds $T(n)H$, $T(n)L$ define upper and lower deadband limits for transitions between the occupant classes.

During operation of the occupant classification algorithm 20 (see FIG. 3) implemented by the occupant classification system 40, the filtered total weight (FilteredTotalWeight) can increase and/or decrease. The hysteresis logic function 400 determines the occupant class as these changes occur. The deadbands defined by the high and low weight/class thresholds $T(n)H$, $T(n)L$ prevent switching between classes when the weight is on the border between the two.

As the filtered total weight (FilteredTotalWeight) increases, the class will not transition to Class 1 until the T1H high weight/class threshold is reached. The class will not transition back to Class 0 until the T1L low weight/class threshold is reached. Similarly, the class will not transition from Class 1 to Class 2 until the T2H high weight/class threshold is reached. The class will not transition from Class 2 to Class 1 until the T2L low weight/class threshold is reached. Finally, the class will not transition from Class 2 to Class 3 until the T3H high weight/class threshold is reached. The class will not transition from Class 3 to Class 2 until the T3L low weight/class threshold is reached.

Referring to FIG. 3, the class selected by the hysteresis logic function 400 is outputted as the instantaneous class (InstantClass). The instantaneous class (InstantClass) is provided to a classification debounce function 450 which helps reduce chatter in the instantaneous class, which can occur due to rough roads or occupant shifting. The classification debounce function 450 inhibits classification changes when either of the longitudinal acceleration high flag (LongAccelHigh) and the lateral acceleration high flag (LatAccelHigh) is set to YES (see, Classification Change Suppression function—FIG. 5). The SelectFilter flag is used to decide the time of debounce for reducing the chatter. When the short filter is used, the debouncing utilizes a shorter time to reduce chatter. When the long filter is used, the debouncing utilizes a longer time to reduce chatter.

The classification debounce function 450 provides the occupant class (OccupantClass), which is provided to a classification override function 500 of occupant classification algorithm 20 (see FIG. 3), which outputs the final classification (FinalClass). The classification override function forces the final classification (FinalClass) to Class 1 when the occupant classification (OccupantClass) is 0 and the passenger buckle status 28 indicates BUCKLED.

The invention claimed is:

1. A vehicle safety system comprising at least one vehicle occupant safety device, an airbag ECU, and a controller configured to determine an occupant classification, wherein the airbag ECU is configured to control actuation of the at least one vehicle occupant safety device in response to the occupant classification, and wherein the controller is configured to determine the occupant classification by:
communicating with a first seat weight sensor to measure a first seat weight indication for the vehicle seat, wherein the first seat weight sensor is located on a lateral side of the vehicle seat at a front location on the vehicle seat;
communicating with a second seat weight sensor to measure a second seat weight indication for the vehicle seat, wherein the second seat weight sensor is located on the lateral side of the vehicle seat at a rear location on the vehicle seat;
communicating with a vehicle acceleration sensor to measure a vehicle acceleration value;
determining a raw weight on the vehicle seat as twice the sum of the first and second seat weight indications;
determining a filtered weight based on the raw weight, wherein the controller is configured to determine the filtered weight by selecting one of an unfiltered weight, a short filtered weight, and a long filtered weight, wherein the short filtered weight is determined using a low pass filter with a comparatively short time constant, and the long filtered weight is determined using a low pass filter with a comparatively long time constant; and
determining the occupant class based on the filtered weight in response to the vehicle acceleration value being less than a predetermined value, wherein the controller is configured to select one of an unfiltered weight, a short filtered weight, and a long filtered weight by:
selecting the long filtered weight in response to determining that the vehicle is moving and the seat is occupied; and
selecting the short filtered weight in response to determining that the vehicle is not moving and the seat is unoccupied.

2. The vehicle safety system recited in claim 1, wherein the controller is further configured to suppress classification changes in response to the vehicle acceleration value being greater than a predetermined threshold value.

3. The vehicle safety system recited in claim 2, wherein the controller is configured to suppress classification changes by suppressing the classifications for a time delay.

4. The vehicle safety system recited in claim 2, wherein the vehicle acceleration value comprises a vehicle lateral acceleration and/or a vehicle longitudinal acceleration.

5. The vehicle safety system recited in claim 1, wherein the occupant class is selected from one of the following classes: no occupant class, child seat class, small adult class, and large adult class.

6. The vehicle safety system recited in claim 5, wherein the no occupant class is associated with measured seat weights up to a first weight, the child seat class is associated with measured seat weights ranging from the first weight up to a second weight, greater than the first weight, the small adult class is associated with measured seat weights ranging from the second weight up to a third weight, greater than the second weight, and the large adult class is associated with measured seat weights greater or equal to than the third weight.

7. The vehicle safety system recited in claim 1, wherein the comparatively short time constant is 1-2 seconds and the comparatively long time constant is 5-20 seconds.

8. The vehicle safety system recited in claim 1, wherein the controller is further configured to override the determined occupant class in response to determining an unbuckled status of the seatbelt associated with the vehicle seat.

9. The vehicle safety system recited in claim 1, wherein the controller is configured to determine the occupant class based on a filtered weight by implementing a hysteresis logic function that assigns the occupant class based on the filtered weight and prevents changes in the assigned occupant class due to fluctuations in the filtered weight due to seat loading in response to vehicle operation and/or the occupant changing positions on the seat.

10. The vehicle safety system recited in claim 9, wherein the hysteresis logic function implements overlapping weight ranges for each occupant class, each weight range comprising a high threshold and a low threshold, wherein the hysteresis logic function assigns the next higher occupant class in response to the filtered weight exceeding the high threshold, and wherein the hysteresis logic function assigns the next lower occupant class in response to the filtered weight dropping below the low threshold.

11. The vehicle safety system recited in claim 10, wherein each weight range further comprises a conformance threshold, wherein the conformance threshold is the nominal weight value for the corresponding occupant class, and wherein the conformance threshold is utilized to determine an initial occupant class.

12. The vehicle safety system recited in claim 1, wherein the controller is configured to determine the filtered weight based on the raw weight by implementing a freeze filter function that freezes the filtered weight value in response to a vehicle lateral acceleration being above a predetermined threshold.

13. The vehicle safety system recited in claim 1, wherein:
the first seat weight sensor is configured to measure seat weight at a front inboard mounting location of the seat, and the second seat weight sensor is configured to measure seat weight at a rear inboard mounting location of the seat; or
the first seat weight sensor is configured to measure seat weight at a front outboard mounting location of the seat, and the second seat weight sensor is configured to measure seat weight at a rear outboard mounting location of the seat.

14. A vehicle safety system comprising at least one vehicle occupant safety device, an airbag ECU, and a controller configured to determine an occupant classification, wherein the airbag ECU is configured to control actuation of the at least one vehicle occupant safety device in response to the occupant classification, and wherein the controller is configured to determine the occupant classification by:
  communicating with a first seat weight sensor to measure a first seat weight indication for the vehicle seat, wherein the first seat weight sensor is located on a lateral side of the vehicle seat at a front location on the vehicle seat;
  communicating with a second seat weight sensor to measure a second seat weight indication for the vehicle seat, wherein the second seat weight sensor is located on the lateral side of the vehicle seat at a rear location on the vehicle seat;
  communicating with a vehicle acceleration sensor to measure a vehicle acceleration value;
  determining a raw weight on the vehicle seat as twice the sum of the first and second seat weight indications;
  determining a filtered weight based on the raw weight, wherein the controller is configured to determine the filtered weight by selecting one of an unfiltered weight, a short filtered weight, and a long filtered weight, wherein the short filtered weight is determined using a low pass filter with a comparatively short time constant, and the long filtered weight is determined using a low pass filter with a comparatively long time constant; and
  determining the occupant class based on the filtered weight in response to the vehicle acceleration value being less than a predetermined value,
  wherein the occupant class is selected from one of the following classes: no occupant class, child seat class, small adult class, and large adult class,
  wherein the no occupant class is associated with measured seat weights up to a first weight, the child seat class is associated with measured seat weights ranging from the first weight up to a second weight, greater than the first weight, the small adult class is associated with measured seat weights ranging from the second weight up to a third weight, greater than the second weight, and the large adult class is associated with measured seat weights greater or equal to than the third weight, and
  wherein the first weight is 10.8 kg, the second weight is 29.4 kg, and the third weight is 54.8 kg.

15. A vehicle safety system comprising at least one vehicle occupant safety device, an airbag ECU, and a controller configured to determine an occupant classification, wherein the airbag ECU is configured to control actuation of the at least one vehicle occupant safety device in response to the occupant classification, and wherein the controller is configured to determine the occupant classification by:
  communicating with a first seat weight sensor to measure a first seat weight indication for the vehicle seat, wherein the first seat weight sensor is located on a lateral side of the vehicle seat at a front location on the vehicle seat;
  communicating with a second seat weight sensor to measure a second seat weight indication for the vehicle seat, wherein the second seat weight sensor is located on the lateral side of the vehicle seat at a rear location on the vehicle seat;
  communicating with a vehicle acceleration sensor to measure a vehicle acceleration value;
  determining a raw weight on the vehicle seat as twice the sum of the first and second seat weight indications;
  determining a filtered weight based on the raw weight, wherein the controller is configured to determine the filtered weight by selecting one of an unfiltered weight, a short filtered weight, and a long filtered weight, wherein the short filtered weight is determined using a low pass filter with a comparatively short time constant, and the long filtered weight is determined using a low pass filter with a comparatively long time constant; and
  determining the occupant class based on the filtered weight in response to the vehicle acceleration value being less than a predetermined value, wherein the controller is configured to select one of an unfiltered weight, a short filtered weight, and a long filtered weight by:
  selecting the unfiltered weight for a predetermined startup time;
  selecting the short filtered weight after the startup time expires;
  selecting the long filtered weight in response to determining that the vehicle is moving and the seat is occupied; and
  selecting the short filtered weight in response to determining that the vehicle is not moving and the seat is unoccupied.

16. The vehicle safety system recited in claim 15, wherein the controller is further configured to suppress classification changes in response to the vehicle acceleration value being greater than a predetermined threshold value.

17. The vehicle safety system recited in claim 16, wherein the controller is configured to suppress classification changes by suppressing the classifications for a time delay.

18. The vehicle safety system recited in claim 16, wherein the vehicle acceleration value comprises a vehicle lateral acceleration and/or a vehicle longitudinal acceleration.

19. The vehicle safety system recited in claim 15, wherein the occupant class is selected from one of the following classes: no occupant class, child seat class, small adult class, and large adult class.

20. The vehicle safety system recited in claim 19, wherein the no occupant class is associated with measured seat weights up to a first weight, the child seat class is associated with measured seat weights ranging from the first weight up to a second weight, greater than the first weight, the small adult class is associated with measured seat weights ranging from the second weight up to a third weight, greater than the second weight, and the large adult class is associated with measured seat weights greater or equal to than the third weight.

21. The vehicle safety system recited in claim 15, wherein the comparatively short time constant is 1-2 seconds and the comparatively long time constant is 5-20 seconds.

22. The vehicle safety system recited in claim 15, wherein the controller is further configured to override the determined occupant class in response to determining an unbuckled status of the seatbelt associated with the vehicle seat.

23. The vehicle safety system recited in claim 15, wherein the controller is configured to determine the occupant class based on a filtered weight by implementing a hysteresis logic function that assigns the occupant class based on the filtered weight and prevents changes in the assigned occupant class due to fluctuations in the filtered weight due to seat loading in response to vehicle operation and/or the occupant changing positions on the seat.

24. The vehicle safety system recited in claim 23, wherein the hysteresis logic function implements overlapping weight ranges for each occupant class, each weight range comprising a high threshold and a low threshold, wherein the hysteresis logic function assigns the next higher occupant class in response to the filtered weight exceeding the high threshold, and wherein the hysteresis logic function assigns the next lower occupant class in response to the filtered weight dropping below the low threshold.

25. The vehicle safety system recited in claim 24, wherein each weight range further comprises a conformance threshold, wherein the conformance threshold is the nominal weight value for the corresponding occupant class, and wherein the conformance threshold is utilized to determine an initial occupant class.

26. The vehicle safety system recited in claim 15, wherein the controller is configured to determine the filtered weight based on the raw weight by implementing a freeze filter function that freezes the filtered weight value in response to a vehicle lateral acceleration being above a predetermined threshold.

27. The vehicle safety system recited in claim 15, wherein:
the first seat weight sensor is configured to measure seat weight at a front inboard mounting location of the seat, and the second seat weight sensor is configured to measure seat weight at a rear inboard mounting location of the seat; or
the first seat weight sensor is configured to measure seat weight at a front outboard mounting location of the seat, and the second seat weight sensor is configured to measure seat weight at a rear outboard mounting location of the seat.

28. A vehicle safety system comprising at least one vehicle occupant safety device, an airbag ECU, and a controller configured to determine an occupant classification, wherein the airbag ECU is configured to control actuation of the at least one vehicle occupant safety device in response to the occupant classification, and wherein the controller is configured to determine the occupant classification by:
communicating with a first seat weight sensor to measure a first seat weight indication for the vehicle seat, wherein the first seat weight sensor is located on a lateral side of the vehicle seat at a front location on the vehicle seat;
communicating with a second seat weight sensor to measure a second seat weight indication for the vehicle seat, wherein the second seat weight sensor is located on the lateral side of the vehicle seat at a rear location on the vehicle seat;
communicating with a vehicle acceleration sensor to measure a vehicle acceleration value;
determining a raw weight on the vehicle seat as twice the sum of the first and second seat weight indications;
determining a filtered weight based on the raw weight, wherein the controller is configured to determine the filtered weight by selecting one of an unfiltered weight, a short filtered weight, and a long filtered weight, wherein the short filtered weight is determined using a low pass filter with a comparatively short time constant, and the long filtered weight is determined using a low pass filter with a comparatively long time constant; and
determining the occupant class based on the filtered weight in response to the vehicle acceleration value being less than a predetermined value, wherein the controller is configured to select one of an unfiltered weight, a short filtered weight, and a long filtered weight by:

selecting the unfiltered weight for an initial startup time;
selecting the short filtered weight until the vehicle is moving and the seat is occupied; and
thereafter selecting the long filtered weight until the vehicle stops moving.

29. The vehicle safety system recited in claim 28, wherein the controller is further configured to suppress classification changes in response to the vehicle acceleration value being greater than a predetermined threshold value.

30. The vehicle safety system recited in claim 29, wherein the controller is configured to suppress classification changes by suppressing the classifications for a time delay.

31. The vehicle safety system recited in claim 29, wherein the vehicle acceleration value comprises a vehicle lateral acceleration and/or a vehicle longitudinal acceleration.

32. The vehicle safety system recited in claim 28, wherein the occupant class is selected from one of the following classes: no occupant class, child seat class, small adult class, and large adult class.

33. The vehicle safety system recited in claim 32, wherein the no occupant class is associated with measured seat weights up to a first weight, the child seat class is associated with measured seat weights ranging from the first weight up to a second weight, greater than the first weight, the small adult class is associated with measured seat weights ranging from the second weight up to a third weight, greater than the second weight, and the large adult class is associated with measured seat weights greater or equal to than the third weight.

34. The vehicle safety system recited in claim 28, wherein the comparatively short time constant is 1-2 seconds and the comparatively long time constant is 5-20 seconds.

35. The vehicle safety system recited in claim 28, wherein the controller is further configured to override the determined occupant class in response to determining an unbuckled status of the seatbelt associated with the vehicle seat.

36. The vehicle safety system recited in claim 28, wherein the controller is configured to determine the occupant class based on a filtered weight by implementing a hysteresis logic function that assigns the occupant class based on the filtered weight and prevents changes in the assigned occupant class due to fluctuations in the filtered weight due to seat loading in response to vehicle operation and/or the occupant changing positions on the seat.

37. The vehicle safety system recited in claim 36, wherein the hysteresis logic function implements overlapping weight ranges for each occupant class, each weight range comprising a high threshold and a low threshold, wherein the hysteresis logic function assigns the next higher occupant class in response to the filtered weight exceeding the high threshold, and wherein the hysteresis logic function assigns the next lower occupant class in response to the filtered weight dropping below the low threshold.

38. The vehicle safety system recited in claim 37, wherein each weight range further comprises a conformance threshold, wherein the conformance threshold is the nominal weight value for the corresponding occupant class, and wherein the conformance threshold is utilized to determine an initial occupant class.

39. The vehicle safety system recited in claim 28, wherein the controller is configured to determine the filtered weight based on the raw weight by implementing a freeze filter function that freezes the filtered weight value in response to a vehicle lateral acceleration being above a predetermined threshold.

40. The vehicle safety system recited in claim 28, wherein:

the first seat weight sensor is configured to measure seat weight at a front inboard mounting location of the seat, and the second seat weight sensor is configured to measure seat weight at a rear inboard mounting location of the seat; or the first seat weight sensor is configured to measure seat weight at a front outboard mounting location of the seat, and the second seat weight sensor is configured to measure seat weight at a rear outboard mounting location of the seat.

* * * * *